Figure 1:
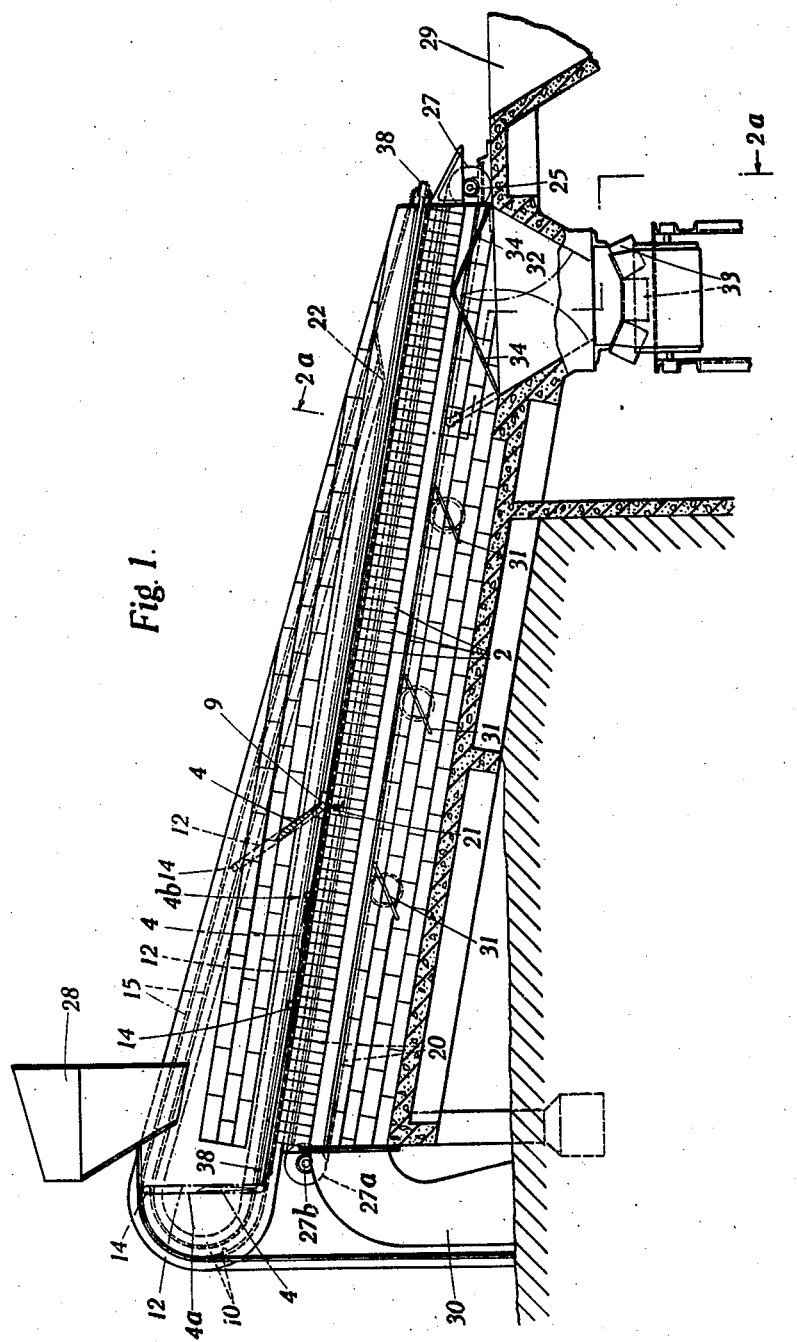

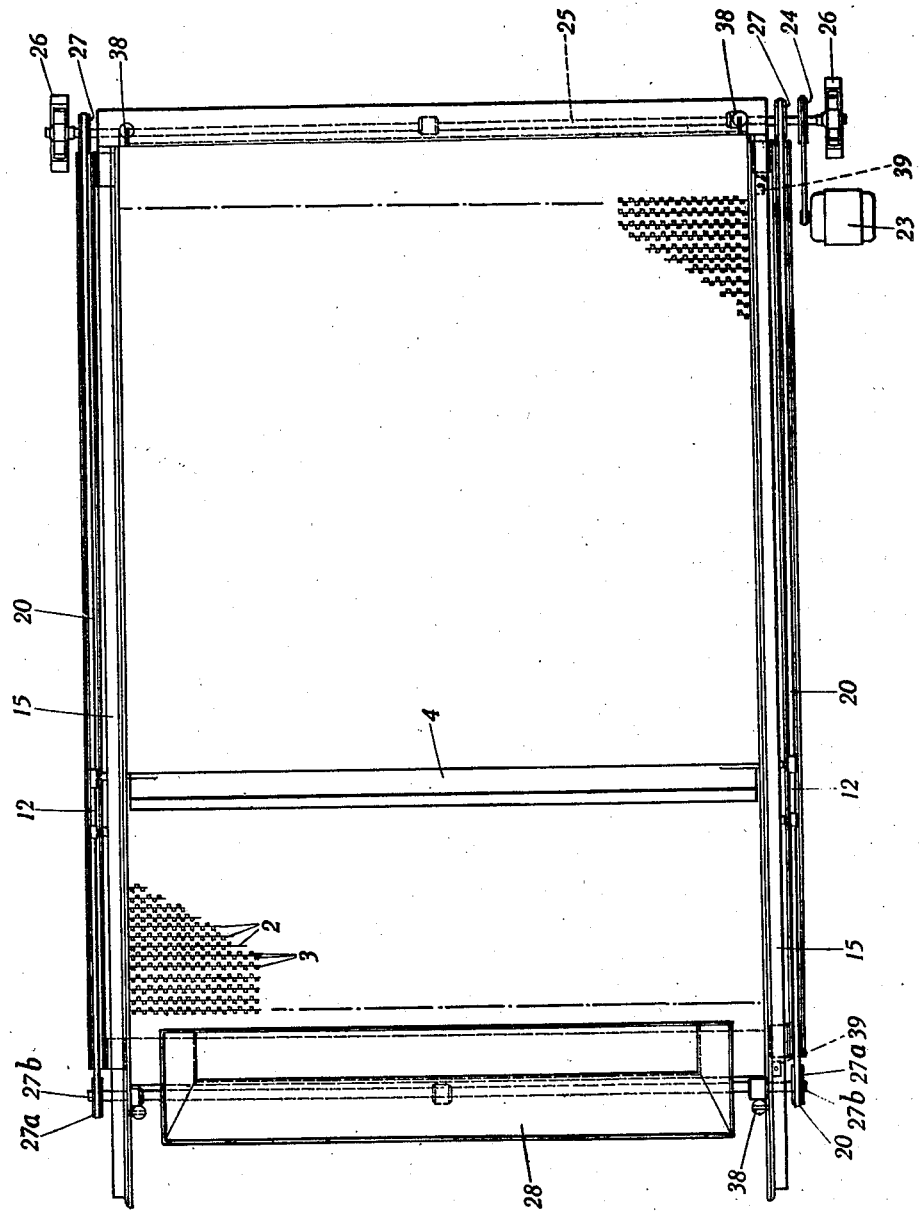

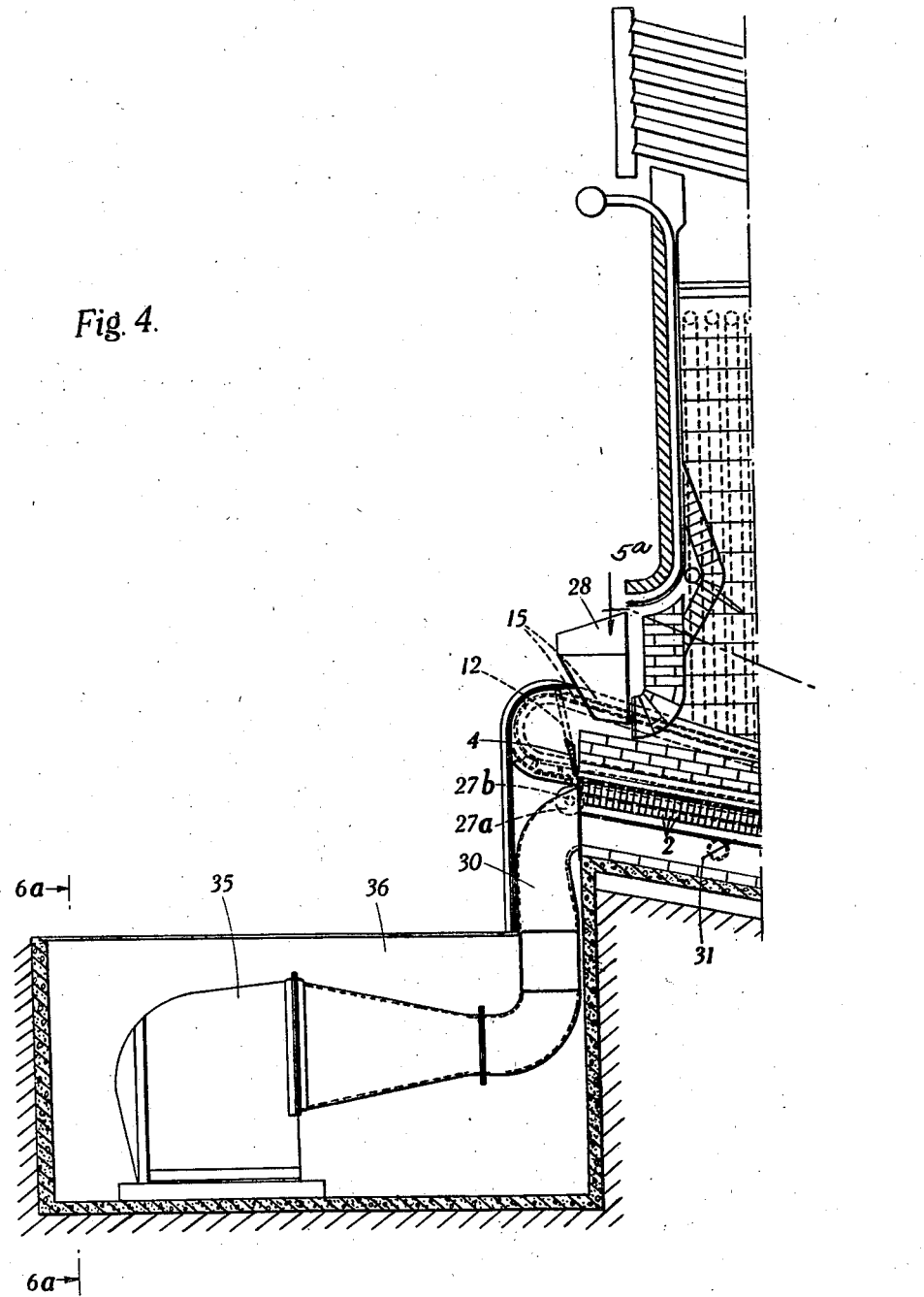

May 12, 1942.　　　F. W. ESKE　　　2,282,713
FURNACE GRATE
Filed April 5, 1940　　　7 Sheets-Sheet 5

INVENTOR
F. W. Eske
BY
Kimmel & Crowell
ATTORNEYS

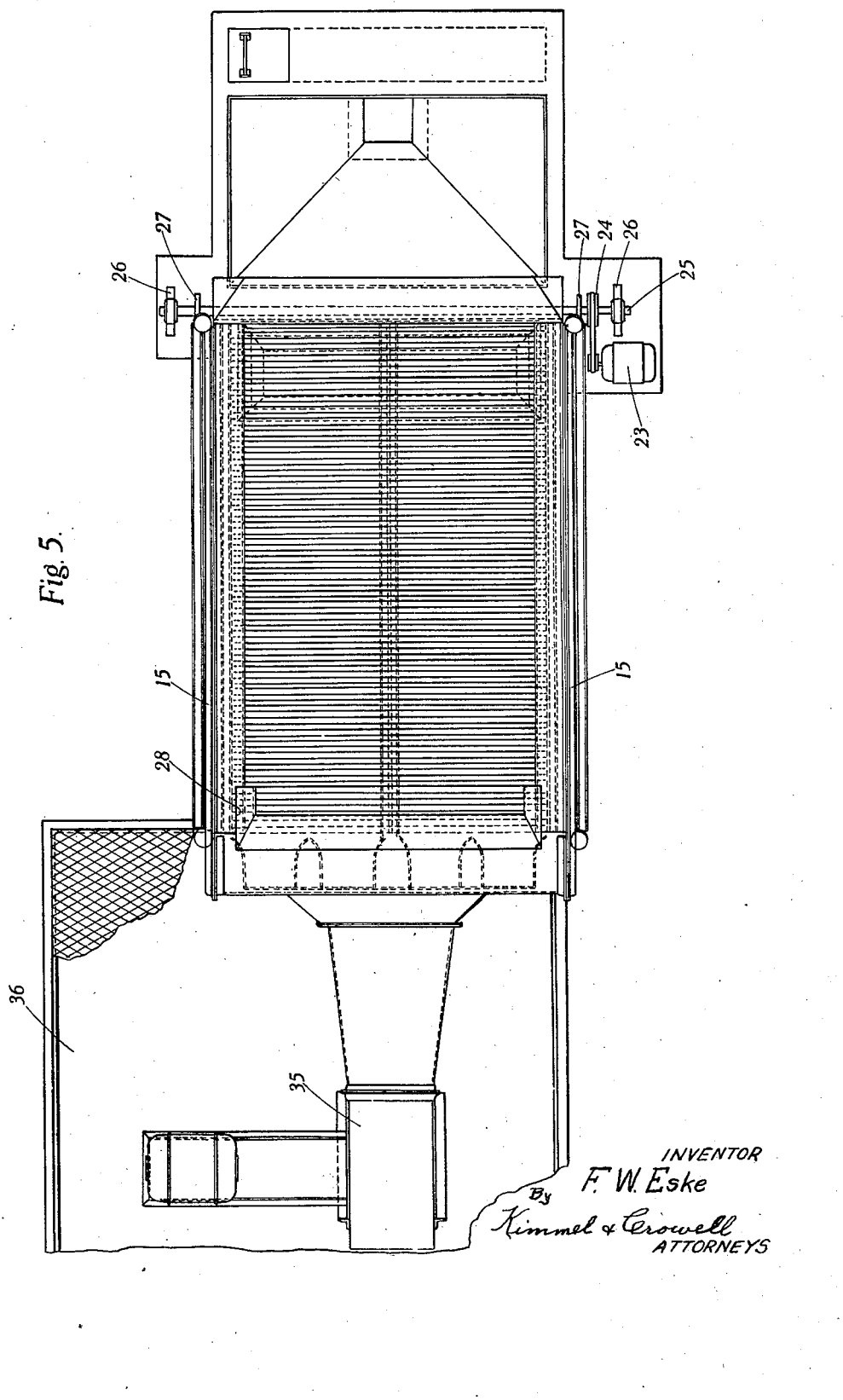

May 12, 1942.  F. W. ESKE  2,282,713
FURNACE GRATE
Filed April 5, 1940   7 Sheets-Sheet 7

INVENTOR
F. W. Eske
By Kimmel & Crowell
ATTORNEYS

Patented May 12, 1942

2,282,713

UNITED STATES PATENT OFFICE 2,282,713

FURNACE GRATE

Friedrich Wilhelm Eske, Sheffield, England

Application April 5, 1940, Serial No. 328,122
In Great Britain April 6, 1939

8 Claims. (Cl. 110—37)

My present invention relates to a furnace grate for a water tube boiler, carbonization plant or a destructor furnace, and has for its object to provide means which will operate completely automatically to distribute the fuel over the entire length of the grate and which will, at the same time, clean the furnace grate by effecting the removal of ash and slag thereon.

The apparatus provided by this invention can be fitted to any kind of furnace burning solid fuel but it is particularly applicable to furnaces for destructors and any type of water tube boiler.

Among the many advantages of the apparatus according to my invention can be mentioned the following. Firstly, as stated above, the apparatus operates completely automatically and therefore does not require constant attention. Secondly, the capacity of the furnace is increased and therefore the output or efficiency of the boiler or destructor, as the case may be is correspondingly increased. Thirdly, the furnace is capable of burning inferior fuel and fourthly, by reason of the fact that the grate is kept clean, the bars are prevented from becoming choked with ash or slag and therefore local heating of the furnace is avoided.

According to my present invention the grate of a furnace adapted to burn any kind of solid fuel is provided with apparatus for distributing the fuel delivered onto the grate and also for effecting removal of ash and slag therefrom, the said apparatus comprising a member adapted to be moved backwards and forwards alternately from one end of the grate to the other, said member extending substantially the whole width of the furnace grate and having a part in close proximity to the surface of the grate, and means being for varying the effective height of said member above the grate so that fuel is free to pass thereover from one side to the other.

According to one form of the invention the said member comprises a blade which is turnable about an axis parallel to and adjacent its lower edge, so that when the blade is inclined the distance of its upper edge above the grate is reduced. It is preferred to change the inclination of the blade gradually as it moves from one end of the grate to the other end and for this purpose the ends of the blade are connected to links which carry rollers adapted to run in spaced guide rails provided at each side of the grate. The distance between the guide rails at each side of the grate is reduced progressively from one end of the furnace to the other so that the links are caused to tilt and thereby rotate the blade about its axis. The blade and associated links are carried by an endless rope or chain at each side of the grate and the arrangement is such that when the blade reaches the rear end of the grate an electric contact is closed so that the drive of an electric motor is reversed and the blade then travels in the opposite direction to the front end of the grate. In this latter direction however, the blade remains substantially flat relatively to the grate.

In order that my invention may be clearly understood and readily carried into effect, I append hereto drawings which illustrate quite diagrammatically and solely by way of example only, the apparatus according to my invention as applied to the furnace grate of a water tube boiler, and the grate of a destructor furnace.

Figure 2:
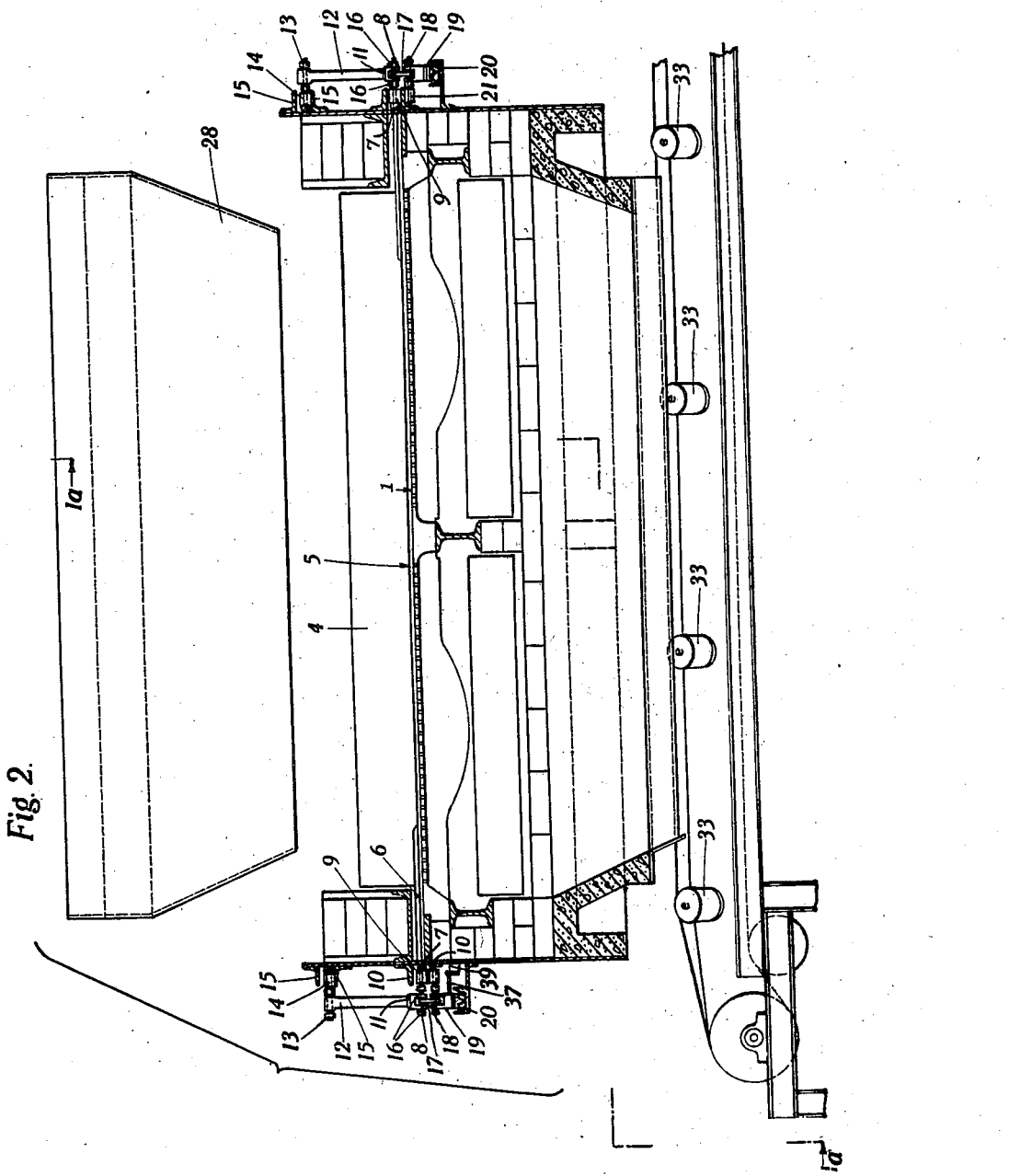
Figure 4A:
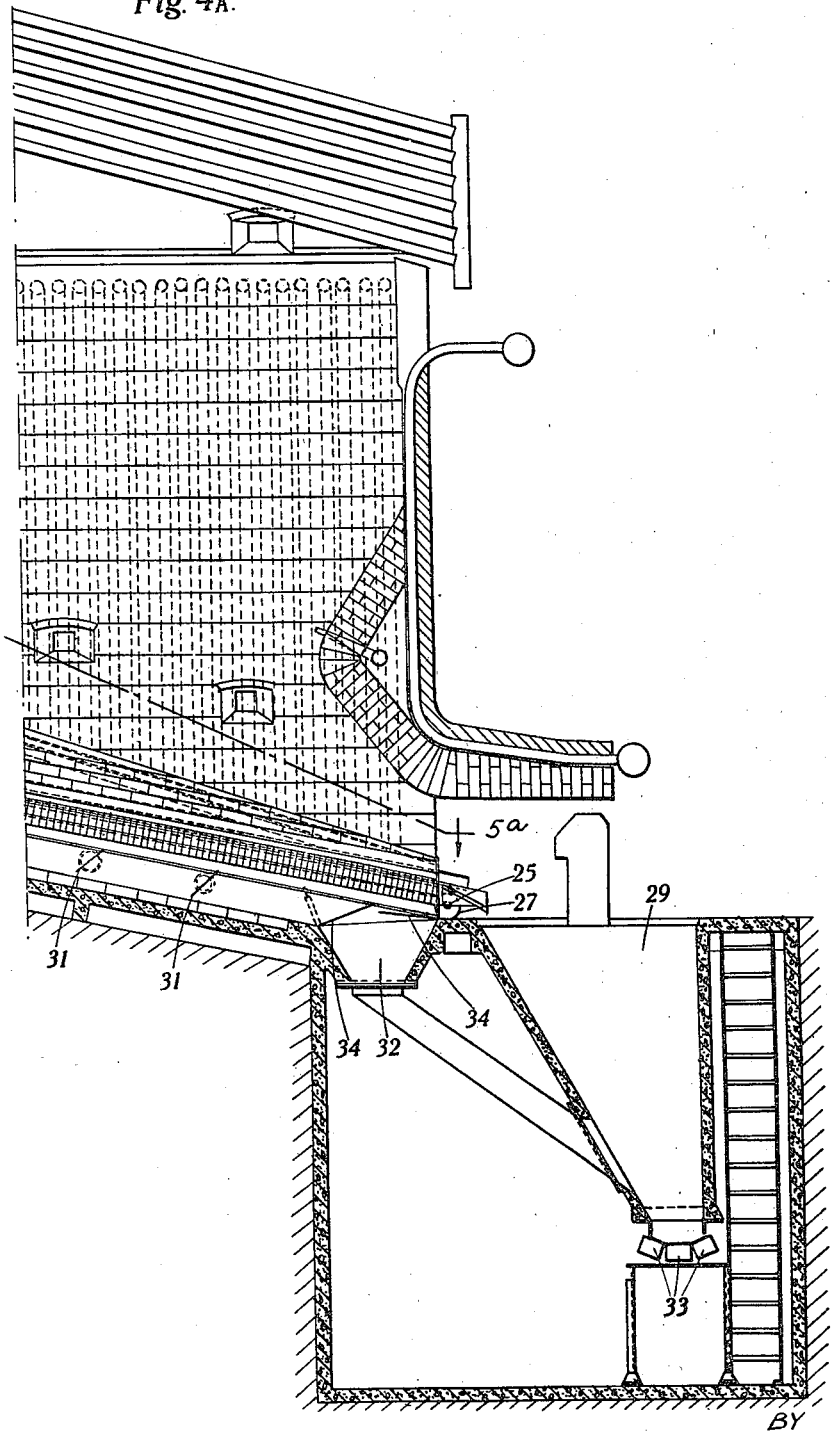
Figure 6:
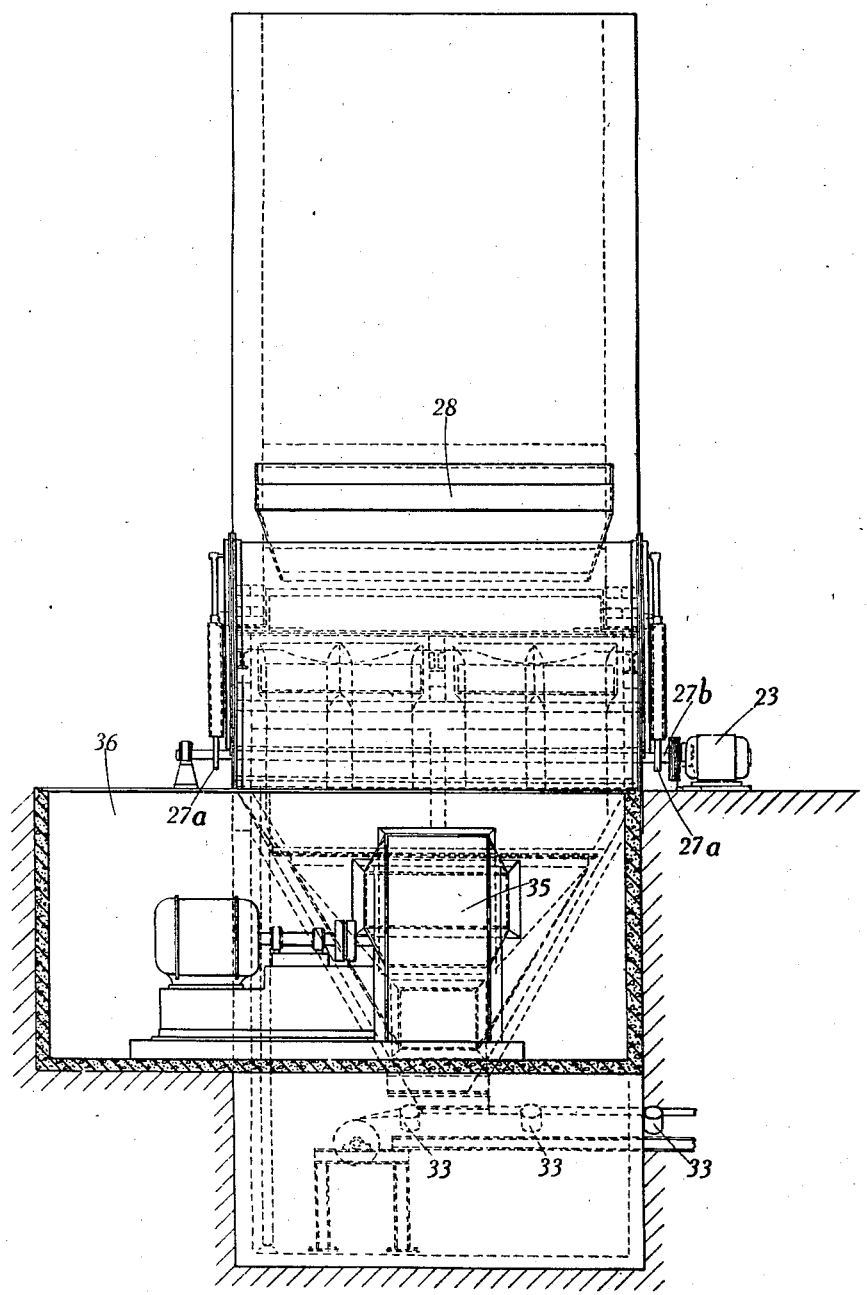

In the drawings:

Figure 1 is a side elevation partly in section illustrating the apparatus, in accordance with this invention as applied to a furnace grate of a destructor plant, Figure 2 is a section taken on the lines $2^a$—$2^a$, Figure 1, Figure 3 is a top plan view of the structure shown by Figure 1, Figures 4 and 4A when taken together is a side elevation partly in section illustrating the apparatus, in accordance with this invention, as applied to a furnace grate of a water tube boiler, Figure 5 is a plan view taken on the lines $5^a$—$5^a$ of Figures 4 and 4A, and Figure 6 is a front elevation of the structure shown by Figures 4 and 4A.

Referring to Figures 1, 2 and 3 of the drawings the surface of the furnace grate is designated by the reference numeral 1, and the ends of a few of the bars 2 thereof, formed with any suitable openings 3, communicating with a space below the grate surface, are shown at the top left hand corner of Figure 3. Provided above the surface of the grate and extending across substantially the whole width thereof is a movable blade 4 supported so that its lower edge 5 is in close proximity to the surface of the grate 1. The blade 4 is supported, in a manner which will be explained hereinafter, so that it can be moved from one end of the furnace grate to the other and back again so as to distribute the fuel over the entire length of the grate, the fuel being fed onto the grate from a hopper 28 located at the front end of the furnace. The blade 4 is carried in such a manner that, at the front end of the furnace, it is supported angularly to the grate surface (as shown at 4a in Figure 1) and as it travels towards the rear of the furnace it gradually assumes a horizontal position or a position substantially parallel to the surface of the grate.

The blade 4 is provided at each end with a laterally disposed part 6 which extends through a longitudinal slot or opening 7 formed in the adjacent side wall of the furnace, and each of said parts 6 terminates in a stub-axle 8. Mounted adjacent one end of each stub-axle 8 (see Figure 2) and free to rotate thereon, is a roller or other suitable anti-friction member 9 which is guided between a pair of superposed lower guide rails 10 fixed to the wall of the furnace. Fixed to each stub-axle 8 adjacent the said roller 9 is the lower bifurcated end 11 of a link 12 which supports at its upper end a spindle 13 upon which is mounted, in a freely rotatable manner, a further roller 14 which is guided between a pair of superposed upper guide rails 15 positioned in spaced relationship above the guide rails 10. Each of the links 12 is made fast to its stub-axle 8 by means of set screws 16 so that when the link 12 is tilted or inclined in a manner which will be explained shortly, the stub-axles 8 are caused to rotate about their axes and consequently the inclination of the blade 4 is changed. On each stub-axle 8, between the prongs of the bifurcated end 11 of the link 12, is mounted the upper end of a second link 17 which supports at its lower end a spindle 18 which in turn supports a bracket 19 connected at its lower end to an endless V rope 20 or other suitable means such as a chain or belt. The inner end of the spindle 18 carries a roller 21 which engages the underside of the lower one of the guide rails 10.

Referring to Figure 1 of the drawings it will be seen that the guide rails 10 are curved to provide a semi-circular track at the front end of the furnace which merges into the upper guide rails 15. The distance between the rails 15 and 10 gradually decreases towards the rear end of the furnace until they meet at a point 22.

As shown by Figure 3, of the drawings, a self-reversing electric motor 23 is provided adjacent one side of the furnace and at the rear end thereof, and this motor drives a wheel 24 mounted on a shaft 25 extending transversely across the rear end of the furnace, and supported in bearings 26. Mounted on the shaft 25 adjacent each end thereof, are wheels 27 and each wheel drives the endless V belt or chain 20 to which the brackets 19, carried at the lower ends of the links 17, are fixed. Further wheels 27a, mounted on a shaft 27b, are provided at the front of the furnace over which the V ropes or chains 20 are guided.

The operation of the apparatus is as follows:

Assuming that a charge of fuel has just been delivered from the hopper 28 on to the grate 1 and that the blade 4 is in a position at the front end of the grate as indicated in chain dotted lines 4a, the blade 4 will be guided along the surface of the grate and will carry with it the charge of fuel. As however, the blade moves along its inclination is progressively changed by reason of the fact that the rollers 14 and 9 are guided in the guide rails 10 and 15 at each side of the furnace and as these guide rails slope towards each other the inclination of links 12 is changed accordingly and turns the stub-axles 8 about their axes and thereupon alters the inclination of the blade. As the amount of fuel to the rear of the blade increases it will pile up against the blade and a quantity of it will drop over the top of the blade to the front of the latter but the ash and the slag will be swept along by the blade until it reaches the rear end of the grate when it is pushed over the end of the grate into a suitable receptacle, a fragment of which is indicated at 29 from which it is removed in any suitable manner. The ash which falls through the openings in the grate into the ash pit is blown towards the rear end of the furnace by air supplied through an air duct 30 at the front end of the furnace. Suitable dampers 31 are provided in the ash pit for regulating the flow of air therethrough. At the rear end of the grate and below the latter a chute 32 is provided into which the ash is blown. The ash from the chute falls onto an endless conveyor 33 comprising two or more parts so as to form a trough and is carried by this conveyor to one side of the furnace. Alternatively, it can be arranged that the chute 32 communicates with the receptacle 29 so as to deliver the ash to the latter. Suitable flaps 34 may be provided if desired for closing or regulating the opening of said chute 32.

When the blade 4 reaches the point 22 the rollers 14 leave the upper guide rails 15 and engage between the lower rails 10, and the blade 4 by this time occupies a substantially horizontal position, or at least a position parallel to the surface of the grate. At this stage an electric contact is closed which reverses the direction of drive of the motor 23 and the direction of travel of the ropes or chains 20 is reversed and the bar 4 is returned to the front of the grate. As the rollers 9 and 14 now run between the guide rails 10 (as indicated at 4b on Figure 1) the faces of the blade 4 remain substantially parallel to the surface of the grate 1 and therefore meets with little opposition from the fuel on the grate. When the blade reaches the front of the furnace grate the rollers 14 pass round the curved part of the rails and the blade 4 accordingly assumes an inclined position. Immediately the "dead centre" is passed a further electric contact is closed and the drive of the electric motor is again reversed and the bar 4 is moved towards the rear of the furnace as previously described.

The apparatus according to this invention can be applied equally well to a horizontally disposed grate instead of a grate which slopes from one end of the furnace to the other.

Referring to Figures 4, 4A, 5 and 6, these figures show the apparatus applied to the furnace grate of a water-tube boiler. The reference numerals used on Figures 1, 2 and 3 are used on these figures to designate similar parts. On these drawings a fan 35 located in a pit 36 is shown for blowing air through the duct 30. The chute 32 into which the ash in the ash-pit is blown is shown in the present example communicating with the receptacle 29.

The foregoing constructions have been described solely by way of example only and various modifications are possible within the scope of the invention as claimed.

The openings 7 in the walls of the furnace through which the parts 6 pass can be closed by a shutter which is pulled along with the links so as to prevent smoke or heated air escaping from the furnace. A suitable device can comprise two strips of heat resisting material such as spring steel or other suitable material which are accommodated respectively in casings 38 connected to the side walls of the furnace at the front and rear thereof. One end of each strip is connected inside its casing to a spring loaded spindle and the other opposed ends of the strips can be connected to the axle 8. The arrangement is such that when the blade travels in one direction one of the strips will unwind and close the opening 7 at one side of the blade whilst the other strip will be wound up to uncover the opening at the other side of the blade so that the latter is free to travel along. Again the ends of the blade 4 can be connected to any suitable type of linkage which is operable to displace the blade 4 about its point of pivotation.

Any suitable mechanism may be employed for opening and closing the electric contacts for reversing the direction of drive of the motor. For example, it can be arranged that a projection 37 (see Fig. 2), carried by one of the links or its associated parts can engage switches 39 supported one at each end of the furnace wall so that when each switch is engaged it closes an electric circuit acting to reverse the drive of the motor and so drive the V rope or chain in the opposite direction.

I claim:

1. In an automatic apparatus for distributing solid fuel above the grate of a furnace and for affecting removal of ash and slag from the furnace, comprising in combination, the furnace grate, a power driven member in the form of a blade adapted to be moved backward and forward above the grate alternately from one end of the grate to the other, said blade extending substantially the whole width of the furnace grate with its lower edge in close proximity to the grate, means for guiding and tilting the blade rearwardly as it travels from the front end to the rear end of the grate and including means whereby the angle at which the blade is supported relative to the grate is reduced progressively until the blade occupies a position parallel to or substantially parallel to the surface of the grate, said guiding and tilting means for the blade being so formed to provide wherein the blade is tiltable about an axis parallel to and adjacent to its lower edge, and means for automatically returning the blade in such position to the front end of the furnace.

2. The invention as set forth in claim 1 having each end of the blade provided with laterally extending means travelling in the furnace wall provided with anti-friction devices correlating with said guiding and tilting means, and links fixed to said laterally extending means provided with anti-friction devices travelling in said guiding and tilting means.

3. In an automatic apparatus for distributing solid fuel above the grate of a furnace and for affecting removal of ash and slag from the furnace, comprising in combination, the furnace grate, a power driven member in the form of a blade adapted to be moved backward and forward above the grate alternately from one end of the grate to the other, said blade extending substantially the whole width of the furnace grate with its lower edge in close proximity to the grate, superposed pairs of upper and lower guide rails disposed outwardly adjacent to the furnace wall for guiding and tilting the blade rearwardly as it travels from the front end to the rear end of the grate, the guide rails of one pair being so related to the guide rails of the other pair to provide whereby the angle at which the blade is supported relative to the grate as it travels rearwardly is reduced progressively until the blade occupies a position parallel to or substantially parallel to the surface of the grate, means for automatically returning the blade in such position to the front end of the grate, each end of the blade being provided with a stub shaft travelling in the furnace wall, anti-friction devices carried by said shafts and correlating with said lower guide rails and links fixed to such stub shafts provided with anti-friction devices correlating with said guide rails.

4. The invention as set forth in claim 3 having the distance between the guide rails of said pairs varying constantly from one end of the grate to the other to bring about uniform tilting movement of said links and consequently of said blade.

5. The invention as set forth in claim 3 having other links attached to the links fixed to the said stub shafts, endless transmission means connected to the said other links, a reversible electric motor for driving said transmission means, controllable means for said motor carried by the said other links, and guide rollers carried by the said other links and correlating with the outer ones of the said pair of lower guide rails.

6. The invention as set forth by claim 1 having said means for guiding and tilting the blade formed with semi-circular portions disposed at the front of the furnace.

7. In an automatic apparatus for distributing solid fuel above the grate of a furnace and also for effecting removal of ash and slag from the furnace comprising in combination, the furnace grate, a power driven member in the form of a blade adapted to be moved backward and forward above the grate alternately from one end of the grate to the other, said blade extending substantially the whole width of the furnace grate with its lower edge in close proximity to the grate, superposed pairs of upper and lower guide rails disposed outwardly of the furnace wall for guiding and tilting the blade rearwardly as it travels from the front end to the rear end of the grate, the guide rails of the upper pair being inclined downwardly and rearwardly throughout towards the guide rails of the lower pair to provide whereby the angle at which the blade is supported relative to the grate as it travels rearwardly is reduced progressively until the blade occupies a position parallel to or substantially parallel to the surface of the grate, means for automatically returning the blade in such position to the front end of the grate, each of said blades being provided at each end with a stub shaft travelling in the furnace wall, anti-friction rollers carried by said stub shafts correlating with said lower guide rails, and links fixed to such stub shafts provided with anti-friction rollers correlating with said guide rails.

8. The invention as set forth by claim 7 having said guide rails connected together by substantially semi-circular portions disposed at the front of the furnace whereby when the blade is travelling from the front to the rear of the grate, the roller on each of said links is guided in the upper guide rails and the roller on each stub shaft in the lower guide rails, the arrangement being such that, as the guide rails are inclined toward each other, the links at each end of the blade are caused to tilt and so incline the blade until the blade reaches a substantially horizontal position or a position parallel to the furnace grate, whereupon the rollers in the upper guide rails enter the lower guide rails when the direction of travel of the blade is reversed and the blade returns in a horizontal position to the front of the furnace with the rollers engaging between the lower guide rails until the rollers adjacent the top of the blade traverse the semi-circular portions of the guides when the blade is again inclined and the said rollers adjacent the top of the blade engage the upper guide rails ready for a further movement of the blade towards the rear end of the furnace.

FRIEDRICH WILHELM ESKE.